July 18, 1967          F. STERZER          3,331,651

PHASED ARRAY LIGHT DEFLECTING SYSTEM

Filed June 24, 1963          2 Sheets-Sheet 1

INVENTOR.
FRED STERZER
BY J. C. Whittaker
Attorney

July 18, 1967  F. STERZER  3,331,651
PHASED ARRAY LIGHT DEFLECTING SYSTEM
Filed June 24, 1963  2 Sheets-Sheet 2
*Fig.2.*
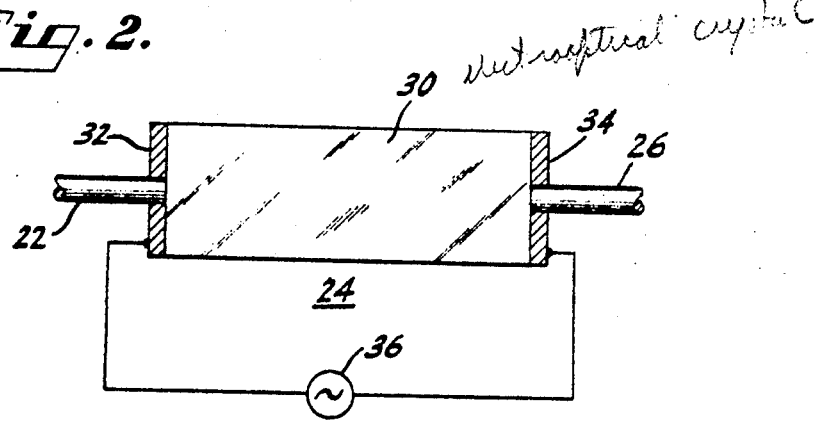
*Fig.3.*
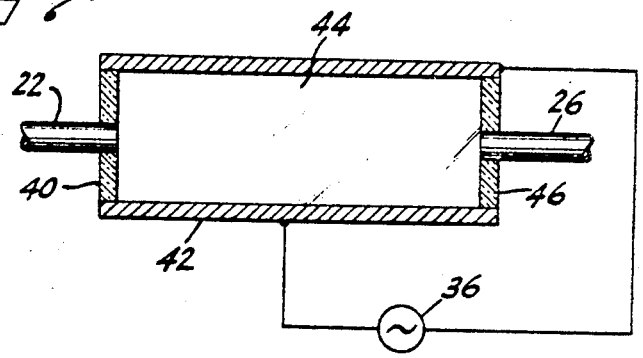
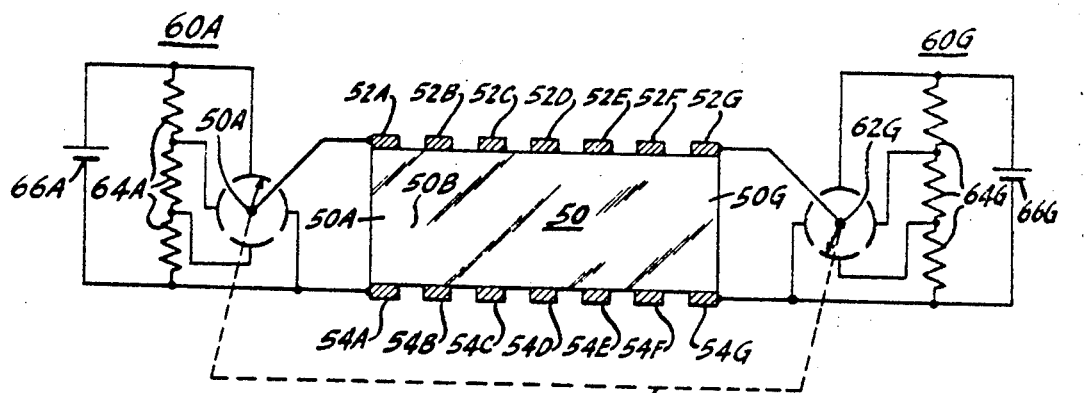
*Fig.4.*
INVENTOR.
FRED STERZER
BY J. C. Whittaker
Attorney United States Patent Office 3,331,651
Patented July 18, 1967

3,331,651
PHASED ARRAY LIGHT DEFLECTING SYSTEM
Fred Sterzer, Princeton, N.J., assignor to Radio Corporation of America, a corporation of Delaware
Filed June 24, 1963, Ser. No. 290,073
6 Claims. (Cl. 350—96)

This invention relates to optical masers or lasers. In particular, this invention relates to a novel method of and means for electronically deflecting or steering a laser beam.

The term laser is a name used to refer to a device which provides "light amplification by stimulated emission of radiation." The laser device is presently used as a source of coherent light.

In general, a laser includes an active laser material that will produce stimulated emission of radiation, and an excitation source of energy that pumps power into the active material. Usually, it is desirable for feedback purposes, to position the active laser material in an optically resonant structure or resonant cavity.

A laser device of the type briefly described above produces a coherent beam of light. A coherent beam of light which is efficiently moved through a solid angle of many degrees, in a short period of time, has numerous applications. For example, an electronically steerable laser beam is useful in an optical radar system, in an optical communication system wherein either the transmitter or receiver is in motion, in ultra high speed printing systems, in machining devices that are controlled by means of electronically directing the laser beam, and in ultra high speed logic circuits.

It is, therefore, an object of this invention to provide an improved laser system in which the laser beam may be electronically deflected or steered.

It is another object of this invention to provide a novel laser system characterized in that the output coherent light beam may be electronically directed through a large solid angle of many degrees.

It is a further object of this invention to provide a novel laser deflection system that is electronically controlled and that may be deflected through a large solid angle in a relatively short period of time.

These and other objects are accomplished in accordance with this invention by providing a laser for producing a coherent output beam. In a typical embodiment of the invention, the laser beam is separated into a plurality of portions by directing the laser beam into the ends of a plurality of closely positioned fiber optic elements. The phase of each of the plurality of components is electronically controlled by use of separate light phase shifters, controlling the phase of the light in each of the plurality of fiber optic elements. The plurality of portions of the beam are then recombined, by means of a second plurality of fiber optic elements which terminate as a radiator. The direction that the recombined laser beam is radiated is a function of the relative phases of the various components. Therefore, the direction of the transmitted laser beam may be deflected by changing the relative phases of the plurality of components by means of the electro-optic light modulators.

The invention will be described in greater detail by reference to the accompanying drawings wherein:

FIGURE 2 is a partial sectional view of an electro-optic phase shifter for use in the system of FIGURE 1;

FIGURE 3 is a sectional view of another type of electro-optic phase shifter for use in the system of FIGURE 1, and FIGURE 4 is a sectional view of another embodiment of a laser steering device in accordance with this invention.

Figure 1:
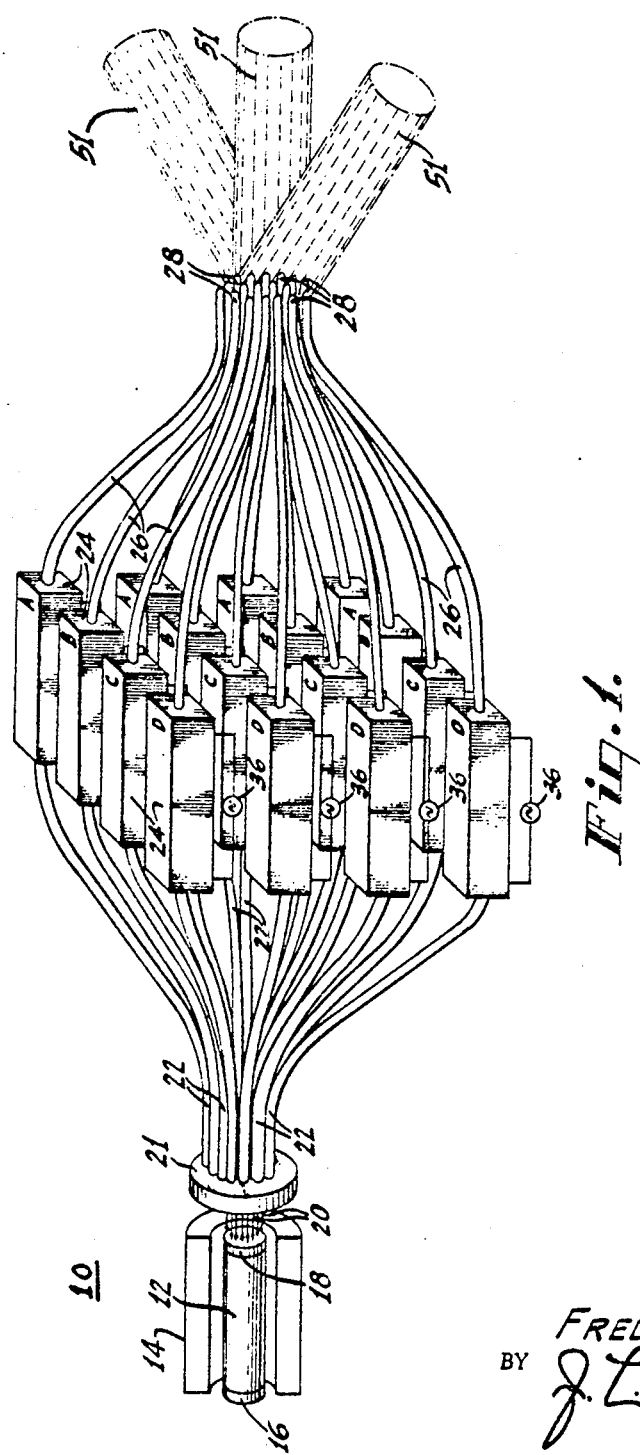
FIGURE 1 is a perspective view of a laser steering device in accordance with this invention.

Referring to FIGURE 1, there is shown a laser device 10 for producing coherent radiation. The laser device 10 comprises a solid active laser body 12, a pumping source 14 and a pair of optical reflecting surfaces 16 and 18. The optical reflecting surfaces 16 and 18 form the ends of a resonant body, or optical resonant cavity, in which the solid active laser body 12 is positioned.

The solid active laser body 12 may comprise any substance having two atomic states or energy levels separated by an amount corresponding to the output frequency desired and which has the property of being excitable into an inverted population density condition. An example of a solid active laser material which exhibits these properties is calcium fluoride doped with divalent dysprosium.

The pumping source 14 may comprise any source of energy which is capable of exciting the ions in the solid active laser body 12 from a lower energy level to a higher energy level. In other words, the pumping source 14 is a source of energy which is capable of establishing the inverted population density condition in the active laser body 12. An example of such a pumping source is an xenon flash tube or other suitable known type of energy source.

Positioned adjacent to the ends of the active laser body 12 are light reflecting members 16 and 18 which form the opposite ends of an optical resonant cavity. The light reflecting members 16 and 18 may be any known type of light reflector such as the Fabry-Perot multi-layer type light reflector, or the more conventional mirror type light reflector. The light reflecting surfaces 16 and 18 are precisely oriented so that a resonant mode will exist between the light reflecting surfaces at frequencies for which the spacing therebetween is an integral number of half wave lengths of the laser frequency. At least a portion of the light reflecting surface 18 is partially transparent, e.g. about 10% transparent, so that the light output beam 20 may be obtained from the laser 10.

The type of laser described above is a solid laser body that is optically pumped. Other types of lasers, e.g. helium-neon gas lasers, may also be used. Other types of pumping systems, e.g. the electrically pumped lasers such as gallium arsenide P-N junction lasers, may be used.

The output beam 20 from the laser device 10 is a coherent light beam of substantially one single phase, and having a wave front substantially normal to the light path. For some laser devices, the laser beam 20 is linearly polarized. If the beam is not polarized, a polarizer 21, which may be a conventional linear polarizer, such as a Nicoll prism, is inserted in the path of the beam 20.

Positioned in the path of the linearly polarized coherent light beam 20 are the ends of a plurality of fiber-optic elements 22. The fiber-optic elements 22 are in close physical contact as illustrated in the drawing. Any number of fiber-optic elements may be used, twelve are illustrated, and the larger the number the better is the direction control.

Fiber-optic elements are well known in the art and generally comprise a coaxial arrangement of two glasses wherein the inner glass has a higher index of refraction than the outer or cladding glass. Thus, any light which enters one end of the fiber-optic elements is internally reflected to pass out the other end of the same fiber. Fiber-optic elements are described in an article entitled "Fiber Optics" by R. L. Stow, Electrical Design News, December 1961, beginning on page 30.

The ends of the fiber-optic elements 22 in the path of the laser beam 20 are in close physical contact so that the laser light beam 20 enters, in substantially equal components, different ones of the plurality of fiber-optic elements 22.

The other ends of each of the fiber-optic elements 22 are optically coupled into a different one of a plurality of electro-optic phase modulators or phase shifters 24. Examples of the electro-optic phase shifters 24 will be explained in detail in connection with FIGURES 2 and 3.

Optically coupled to the opposite ends of each of the electro-optic phase shifters 24 is a different one of a second plurality of fiber optic elements 26. The fiber-optic elements 26 terminate in a radiator or antenna end 28. The fiber-optic elements 22 and 26 are shown in greatly enlarged form for simplicity of illustration. In actual practice, fiber-optic elements may be, by way of example, approximately 7 microns in diameter. At the antenna end 28 the second plurality of fiber-optic elements 26 are in close physical proximity or contact so that the output of the antenna end 28 will be a coherent light beam having substantially the same size as the input coherent light beam 20.

Referring to FIGURE 2 there is shown an embodiment of an electro-optic phase shifter 24. The electro-optic phase shifter 24 comprises a crystal 30 of a material exhibiting the linear electro-optic effect. Positioned on the ends of the crystal 30 are a pair of opaque electrodes 32 and 34 each having an aperture therein. Extending into the aperture in each of the electrodes 32 and 34 is one of the fiber-optic elements 22 and one of the fiber-optic elements 26. The crystal 30 may be made of a material such as potassium dihydrogen phosphate or cuprous chloride. The electrodes 32 and 34 may be made of any electrically conductive material, such as copper, and are preferably opaque to prevent extraneous light from entering into the crystal 30. Connected to the electrodes 32 and 34 are sources of potential 36 each of which may be a variable DC power supply.

When desired the voltages across the plurality of electro-optic phase shifters 24 of FIGURE 1 may be varied in time so as to produce a predetermined deflection or scanning system. This time-controlled variations of the voltages may be produced by connecting the sources 36 through pre-programmed voltage control devices (not shown in FIGURE 2).

The embodiment of an electro-optic phase shifter shown in FIGURE 3 differs from that shown in FIGURE 2 in that the electric field is applied, between electrodes 40 and 42, that is transverse to the direction of the light path through the crystal 44. Also, the ends of the crystal 44 are coated with an opaque insulating coating 46 to prevent extraneous light from entering or leaving the electro-optic crystal 44. Certain materials, such as cuprous chloride exhibit the electro-optic effect efficiently when the electric field is transverse to the light path, and the structure of FIGURE 3 may then be used. Other materials, such as potassium dihydrogen phosphate exhibit the electro-optic effect more efficiently when the electric field is parallel to the light path and the structure of FIGURE 2 should then be used.

An example of a suitable crystal material 30 is cuprous chloride. With a crystal of cuprous chloride, and no electric field applied, the velocity of light in the crystal is substantially independent of both the direction of light travel and the direction of polarization of the light, i.e. the crystal is isotropic. When an electric field is applied across the cuprous chloride crystal, then, in general, the crystal becomes biaxial, and the velocity of a light beam traveling through the crystal depends upon the direction of polarization of the light beam.

For every direction of light travel through the crystal, there is a "fast" and a "slow" axis which are at right angles to each other. A light beam which is polarized along the "fast" axis has its velocity increased when the electric field is applied, and a light beam which is polarized along the "slow" axis is delayed by the application of an electric field. In either case, the amount of the velocity change depends upon the magnitude of the electric field. In the embodiment shown in FIGURE 1, all of the modulators 24 have their crystals 30 oriented in the same direction so that each of the light beam portions is polarized along either the "slow" or the "fast" axis.

Electro-optic crystals are known and are described, for example, in detail in an article entitled "Optical Properties and the Electro-Optic and the Photo-Elastic Effects in Crystals Expressed in Tensor Form," by W. P. Mason, appearing in The Bell System Technical Journal, vol. XXIX, pages 161–188, published April 1950.

Each of the electro-optic modulators of the type shown in FIGURE 2 or FIGURE 3, is for the purpose of changing the phase of the light passing through the particular modulator. The phase change is caused by a change in the complex index of refraction, due to the potentials applied, and is a known phenomena. For example, the electronically controlled phase shift devices are described in an article appearing in the Digest of Technical Papers, 1963, International Solid-State Circuits Conference, February 1963, pages 112–113, entitled "Cuprous Chloride Light Modulators" by F. Sterzer et al.

In operation of the device or system shown in FIGURE 1, the linearly polarized output light beam 20 of the laser 10 is separated into a plurality of equal parts or portions by means of the plurality of fiber-optic elements 22. In optical series with each of the fiber-optic elements 22 is a different one of the electro-optic phase shifters 24. By varying the potential applied to the different electro-optic phase shifters 24, the phase shift of each individual light beam, passing through each of the phase shifters 24, is controlled. By applying different voltages to the phase shifters 24 the relative phases of the beam portions may be varied by as much as 360°. Each of the phase shifters 24 may produce a phase change on the light passing therethrough. The phase change produced by the application of the electric field is in addition to any inherent phase change caused by the light passing through the phase shifters. After passing through the electro-optic phase shifters 24, the light is recombined by the fiber-optic members 26 and is radiated from the rounded end of each of the fiber-optic members 26 that function as an optic antenna 28. Because of interference between the light outputs of the individual fibers 26, the direction of the beam 51 is determined by the relative phases of the light emitted from the individual fibers 26. The phenomena that occurs when two light beams, having different phases, are mixed is described in Born and Wolf, "Principles of Optics," Pergamon Press, 1959. The relative phase change of each component is controlled by the voltage applied across the electro-optic phase shifter 24 in the path of that component. Thus, the direction of the composite laser beam 51 may be electronically controlled.

Horizontal deflections may be obtained by varying the potentials applied in the various columns labeled A, B, C, and D, each successively retarded with respect to the next for beam deflection in one direction or each respectively advanced with respect to the next for beam deflection in the other direction. Vertical deflections may be obtained by applying varying potentials and, therefore, varying phase delays in various rows. Also, combinations of vertical and horizontal deflections may be obtained by appropriate choices of potentials applied to the various electro-optic phase shifters 24.

During operation of this invention the position, or direction, of the coherent light beam 51 may be shifted. or deflected, through solid angles of many degrees in times of the order of nanoseconds.

Referring now to FIGURE 4, there is shown an embodiment of this inevntion wherein an electro-optic crystal 50 has a plurality of pairs of electrodes comprising electrodes 52A through 52G, electrodes 54A through 54G on opposite faces thereof. When a laser beam is directed through a crystal in a direction into the paper as the device is shown, and the potential difference is varied between the A electrodes, the B electrodes, etc., the phase of a portion of the laser beam, for example in region 50A, is shifted with respect to the other portions of the laser beam passing through a region of the crystal 50 such as regions 50B . . . 50G, which have different potentials applied thereto. Thus, this embodiment produces the steerable light beam without dividing the beam into the separate, discrete portions. The electrodes 52A through 52G and 54A through 54G may be provided by any of the conventional techniques such as evaporation through a suitable masking element.

When desired, the voltages applied across the pairs of electrodes 52A . . . 52G and 54A . . . 54G may be varied in time so as to produce a predetermined deflection or scanning system, for example a flying light spot. The time controlled voltage variations may be produced by connecting each pair of electrodes through suitable circuits 60A–60G. Only the circuits for the A and G electrodes are shown for simplicity of illustration. An example of pre-programmed voltage control device is a stepping relay 62A connected across a voltage divider 64 and to a power supply 66. The stepping relays 62A . . . 62G may be controlled in any desired time sequence by any conventional means illustrated as dotted line 68.

What is claimed is:

1. A light deflecting system comprising means for producing a first coherent beam of light having a significant cross-section and having a plane wavefront perpendicular to a first given direction, whereby said first coherent beam can be considered to be composed of an array of a plurality of parallel sub-beams each having a plane wavefront perpendicular to said first given direction, optical means including signal-controlled phase shifting means in cooperative relationship with said first coherent beam for phase shifting individual ones of said sub-beams in accordance with a control signal applied to said phase shifting means by those respective selected amounts which result in deriving from said first beam a second coherent beam of light having a substantial cross-section and having a plane wavefront perpendicular to a second given direction, said second given direction being deflected with respect to said first given direction by a variable amount which is dependent upon said control signal, and means for applying said control signal to said phase shifting means.

2. The light deflection system defined in claim 1, wherein said array is a two-dimensional array.

3. The light deflection system defined in claim 1, wherein said optical means including phase shifting means comprises a single electro-optic crystal in cooperative relationship with said first beam, said crystal having a plurality of separate respective regions thereof each of which is in cooperative relationship with and corresponds to different respective one of said sub-beams, an individual pair of electrodes in cooperative relationship with each separate region, and means for applying a separate signal across each pair of electrodes.

4. The light deflecting system defined in claim 1, wherein said optical means including phase shifting means comprises a plurality of input fiber-optic elements each of which is in cooperative relationship with and corresponds to a different one of said sub-beams, individual output fiber-optic elements corresponding to each respective one of said input fiber-optic elements, and a separate signal-controlled phase shifter serially connecting each input fiber-optic element to its corresponding output fiber-optic element, said output fiber-optic elements being arranged to transmit said second beam as an output therefrom in response to said first beam being applied to said input fiber-optic elements.

5. The light deflecting system defined in claim 4, wherein said second given direction with respect to said first given direction varies in accordance with the respective signals applied to said respective signal-controlled phase shifters.

6. The light deflection system defined in claim 4, wherein each of said phase shifters is an electro-optic crystal.

References Cited

UNITED STATES PATENTS

| | | | |
|---|---|---|---|
| 2,163,550 | 6/1939 | Clothier et al. | 88—61 |
| 2,928,075 | 3/1960 | Anderson | 88—614 |
| 3,008,142 | 11/1961 | Saltzman et al. | 343—777 |
| 3,126,485 | 3/1964 | Ashkin et al. | 331—94.5 X |
| 3,157,726 | 11/1964 | Hicks et al. | 88—1 |
| 3,160,887 | 12/1964 | Broussaud et al. | 343—777 |
| 3,199,049 | 8/1965 | Morse et al. | 331—94.5 |
| 3,205,501 | 9/1965 | Kuhn | 343—778 |
| 3,233,108 | 2/1966 | Rosenblum | 331—94.5 |
| 3,235,768 | 2/1966 | Magnuski | 343—778 |

FOREIGN PATENTS

| | | |
|---|---|---|
| 342,219 | 1/1931 | Great Britain. |

OTHER REFERENCES

Jenkins et al, "Fundamentals of Optics," Jenkins and White, 2nd ed., pp. 240–241, McGraw-Hill, New York, 1950.

JEWELL H. PEDERSEN, *Primary Examiner.*

RONALD L. WIBERT, *Assistant Examiner.*